(12) United States Patent
Bellanger et al.

(10) Patent No.: US 7,072,412 B1
(45) Date of Patent: Jul. 4, 2006

(54) MULTICARRIER DIGITAL TRANSMISSION SYSTEM USING AN OQAM TRANSMULTIPLEXER

(76) Inventors: Maurice Bellanger, 72, boulevard Raspail, Paris (FR) F-7500; Tich Dao, 22446 Linda Ann Ct., Cupertino, CA (US) 95014

( * ) Notice: Subject to any disclaimer, the term of this patent is extended or adjusted under 35 U.S.C. 154(b) by 788 days.

(21) Appl. No.: 10/111,821

(22) PCT Filed: Nov. 9, 2000

(86) PCT No.: PCT/US00/42048

§ 371 (c)(1),
(2), (4) Date: Apr. 25, 2002

(87) PCT Pub. No.: WO01/35561

PCT Pub. Date: May 17, 2001

(30) Foreign Application Priority Data

Nov. 9, 1999 (FR) .................................. 99/14036

(51) Int. Cl.
*H04L 23/02* (2006.01)
*H04L 7/00* (2006.01)
(52) U.S. Cl. ........................................ 375/261; 375/354
(58) Field of Classification Search ................ 375/259, 375/260, 261, 298, 229, 354, 355
See application file for complete search history.

(56) References Cited

U.S. PATENT DOCUMENTS

| | | |
|---|---|---|
| 3,674,937 A | 7/1972 | Bellanger et al. |
| 3,801,913 A | 4/1974 | Daguet et al. |
| 3,891,803 A | 6/1975 | Daguet et al. |
| 3,904,963 A | 9/1975 | Bellanger et al. |
| 3,928,755 A | 12/1975 | Bellanger et al. |
| 3,930,147 A | 12/1975 | Bellanger et al. |
| 3,971,922 A | 7/1976 | Bellanger et al. |
| 4,020,288 A | 4/1977 | Bellanger et al. |
| 4,101,738 A | 7/1978 | Bellanger et al. |
| 4,312,062 A | 1/1982 | Bellanger et al. |
| 4,320,362 A | 3/1982 | Bellanger et al. |

(Continued)

FOREIGN PATENT DOCUMENTS

EP    0 793 369 A2    9/1997

(Continued)

OTHER PUBLICATIONS

Gibbs, W. Wayt—"The Network in Every Room"—Scientific American/Feb. 2002 (pp. 38-43).

(Continued)

*Primary Examiner*—Jay K. Patel
*Assistant Examiner*—David B. Lugo
(74) *Attorney, Agent, or Firm*—Donald E. Schreiber (57) ABSTRACT

An emitter converts a serial input data stream into a set of parallel substreams. An OQAM modulator (120) receives and supplies each substream to an input of a synthesis filter bank (130). Synchronization input(s) of the filter bank receive an OQAM signal that carries a data sequence. This sequence contains frame, superframe and hyperframe synchronization patterns, and specifies the number of bits allocated to each subchannel. A receiver (200) includes an analysis filter bank (210) that decomposes the multicarrier signal into a set of elementary signals for each subchannel. A synchronizing processing block (270) receives output(s) of the filter bank for synchronization subchannel(s). The block (270) includes a first cascade of blocks that control receiver sampling times, and a second cascade of blocks that extract synchronization patterns and subchannel bit assignment data. Other filter bank outputs are each coupled to a cascade subchannel equalizer (220) followed by a data extractor (230) and a parallel-to-serial converter (240).

11 Claims, 3 Drawing Sheets

Digital Multicarrier Emitter

U.S. PATENT DOCUMENTS

| | | | |
|---|---|---|---|
| 4,485,272 A | 11/1984 | Duong et al. |
| 4,575,682 A | 3/1986 | Aoyagi |
| 4,621,355 A | 11/1986 | Hirosaki |
| 4,853,802 A | 8/1989 | Kukson et al. |
| 5,132,988 A | 7/1992 | Fisher et al. |
| 5,148,765 A | 9/1992 | Hung et al. |
| 5,220,570 A | 6/1993 | Lou et al. |
| 5,285,474 A | 2/1994 | Chow et al. |
| 5,317,596 A | 5/1994 | Ho et al. |
| 5,400,322 A | 3/1995 | Hunt et al. |
| 5,430,661 A | 7/1995 | Fisher et al. |
| 5,479,447 A | 12/1995 | Chow et al. |
| 5,495,507 A | 2/1996 | Bellanger et al. |
| 5,497,398 A | 3/1996 | Tzannes et al. |
| 5,519,731 A | 5/1996 | Cioffi |
| 5,557,612 A | 9/1996 | Bingham |
| 5,565,868 A | 10/1996 | Azrouf et al. |
| 5,596,604 A | 1/1997 | Cioffi et al. |
| 5,604,690 A | 2/1997 | Bellanger |
| 5,623,513 A | 4/1997 | Chow et al. |
| 5,625,651 A | 4/1997 | Cioffi |
| 5,627,863 A | 5/1997 | Aslanis et al. |
| 5,631,610 A | 5/1997 | Sandberg et al. |
| 5,633,979 A | 5/1997 | Bellanger |
| 5,636,246 A | 6/1997 | Tzannes et al. |
| 5,640,423 A * | 6/1997 | Archer .................. 375/261 |
| 5,644,573 A | 7/1997 | Bingham et al. |
| 5,644,596 A | 7/1997 | Sih |
| 5,673,290 A | 9/1997 | Cioffi |
| 5,680,394 A | 10/1997 | Bingham et al. |
| 5,694,349 A | 12/1997 | Pal |
| 5,715,280 A | 2/1998 | Sandberg et al. |
| 6,047,025 A | 4/2000 | Johnson et al. |

FOREIGN PATENT DOCUMENTS

WO  WO 98/21861  5/1998

OTHER PUBLICATIONS

Slobodan Nedic,, "An Unified Approach to Equalization and Echo Cancellation in OQAM-based Multi-Carrier Data Transmission", IEEE, published Nov. 3, 1997, pp. 1519-1523.

Maurice G. Bellanger, et al., "Equalization Issues in Multicarrier Transmission Using Filter Banks", Ann. Telecommunication, No. 52, 1-2, 1997, pp. 1/8-8/8.

* cited by examiner

Fig.1. Multicarrier Transmission System

Fig.2. Digital Multicarrier Emitter

Fig.3. Synchronization subchannel signal

Fig.4. Digital Multicarrier Receiver

Fig.5. Subchannel Equalizer

Fig.6. Processing of received synchronization channel

MULTICARRIER DIGITAL TRANSMISSION SYSTEM USING AN OQAM TRANSMULTIPLEXER

TECHNICAL FIELD

The present invention relates to systems for the transmission of digital data over a communication channel using a multicarrier modulation and, more particularly, to an improved OQAM transmultiplexer method for use in such systems.

BACKGROUND ART

A multicarrier transmission system, as opposed to a single carrier system, uses a set of different frequencies distributed in the transmission channel frequency band to carry the data. The main advantage is that the bit rate can be adjusted for each carrier, according to the noise and distortion power in the vicinity of this carrier. Thus, a better approximation of the theoretical information capacity limit can be expected and, particularly, poor quality channels can be exploited, like some wireless communication channels, power lines or the telephone subscriber lines at high or very high frequencies. A detailed description of existing multicarrier transmission systems and their merits compared to single carrier systems is given in the book by W. Y. Chen: <<DSL-Simulation Techniques and Standards Development for Digital Subscriber Line Systems>>, MacMillan Technical Publishing, Indianapolis, USA, 1998.

In order to efficiently perform multicarrier transmission, two basic approaches have been considered so far. The first one and most widely used is called OFDM (Orthogonal Frequency Division Multiplexing) or DMT (Digital Multi-Tone) and it is based on the FFT (Fast Fourier Transform). It has been a subject of intense research and development efforts. In that scheme, the data are arranged in blocks which are transmitted by orthogonal carriers, and separated by guard times, which have to be greater than the channel impulse response, to preserve the orthogonality of the carriers at the receiving side. In spite of the potential of the approach, OFDM/DMT suffers from a number of weaknesses, which, overall, make it perform hardly better than single carrier transmission: a complex time equalizer has to be introduced in front of the receiver to reduce the channel impulse response length, very precise time synchronization is necessary, a long initialization phase is required, and the carriers, and subchannels, are poorly separated, which reduces the capacity of the system in the presence of jammers. In fact, a good quality channel is necessary for that scheme to work properly. Ample documentation can be found in the literature and a good list of references is given in the book by W. Y. Chen.

A second approach aims at overcoming some of the OFDM/DMT limitations through the use of more sophisticated transforms than the FFT, namely, lapped transforms and wavelet transforms. The idea is to improve the separation between carriers, or subchannels. A lot of theoretical work has been done about this subject, see for example the paper by S. D. Sandberg and M. A. Tzannes: <<Overlapped Discrete Multitone Modulation for High Speed Copper Wire Communications>>, IEEE-JSAC, Vol. 13, N°9, December 1995. Although they improve the subchannel separation, the lapped and wavelet approaches still retain some of the crucial OFDM/DMT limitations and particularly the time synchronization requirements.

In fact, the ideal approach for multicarrier transmission is one in which the subchannels are made independent and this is achieved by filter banks. This has been recognized a long time, and an efficient implementation of filter banks for transmission systems, based on the combination of an FFT processor with a polyphase network, has been presented in the paper by M. Bellanger and J. Daguet: <<TDM-FDM Transmultiplexer: Digital Polyphase and FFT>>, IEEE Transactions on Communications, Vol. COM-22, September 1974. Later on, a technique called OQAM (Orthogonal Quadrature Amplitude Modulation) has been proposed for multicarrier transmission with filter banks, see the paper by B. Hirosaki, <<An Orthogonally Multiplexed QAM System Using the Discrete Fourier Transform>>, IEEE Trans. on Communications, Vol. COM-29, July 1981. Its main feature is that the subchannel sampling rate is twice the Nyquist subchannel frequency, or subchannel spacing, and the data are transmitted alternatively on the real and the imaginary part of the complex signal in any subchannel, with, again, an alternation between two adjacent subchannels. With this technique, intersymbol interference is eliminated in a subchannel and between adjacent subchannels. The distortions introduced by the transmission channel can be eliminated by a multibranch equalizer in each subchannel. Recently, it has been shown that a single branch equalizer can be used, see the paper by L. Qin and M. Bellanger, <<Equalization issues in Multicarrier Transmission Using Filter Banks>>, Annals of Telecommunications, Vol. 52, N°1–2, January 1997.

In spite of its potential theoretical advantages, the OQAM multicarrier approach is seldom considered for implementation in practical systems. A key reason is that the real/imaginary alternation principle raises problems, which have not been adequately solved thus far, for the equalization algorithms, the carrier synchronization and the system timing organization.

DISCLOSURE OF INVENTION

It is a primary object of the present invention, to achieve a highly robust and efficient multicarrier transmission system, using the transmultiplexer concept of filter banks in combination with OQAM modulation.

The above and other objects are achieved in accordance with the present invention wherein a signal containing synchronization patterns which define a timing structure consisting of frames, superframes and hyperframes is fed, in the emitter, to the input of one or several subchannels reserved for synchronization, the relevant information being carried by the magnitude or envelop of the complex OQAM signal. The same signal also contains service data giving the number of bits allocated to each subchannel. In the other subchannels, a short fixed pattern is introduced periodically to serve as a reference signal for the subchannel equalizers in the receiver.

At the output of the analysis filter bank in the receiver, the signal corresponding to the synchronization subchannel(s) is coupled to a first cascade containing an amplitude equalizer, an envelop detector and a filter that delivers the control signal for the phase lock loop associated with the receiver clock generator and to a second cascade containing an amplitude and phase equalizer, a data detector and a block for the identification of the superframe and hyperframe synchronization patterns and the service data extraction. The other outputs of the analysis filter bank are coupled to cascade subchannel equalizers consisting of three elements each, namely an amplitude equalizer, a phase equalizer and a fine equalizer. Every subchannel equalizer is followed by a data extractor and both use the information provided by the synchronization subchannel to complete their functions. The output error signals are used to determine the number of bits assigned to each subchannel and the information is transmitted to the distant terminal via the synchronization subchannel(s) every hyperframe.

With the system of the invention, no initialization specific sequence is necessary at the beginning of a transmission session or after an interruption, and the bit rate distribution among the subchannels can be adjusted continuously in time during the transmission.

These and other features, objects and advantages will be understood or apparent to those of ordinary skill in the art from the following detailed description of the preferred embodiment as illustrated in the various drawing figures.

BRIEF DESCRIPTION OF DRAWINGS

The invention will be more fully appreciated from the following detailed description when the same is considered in connection with the accompanying drawings, in which.

BEST MODE FOR CARRYING OUT THE INVENTION

Figure 1:
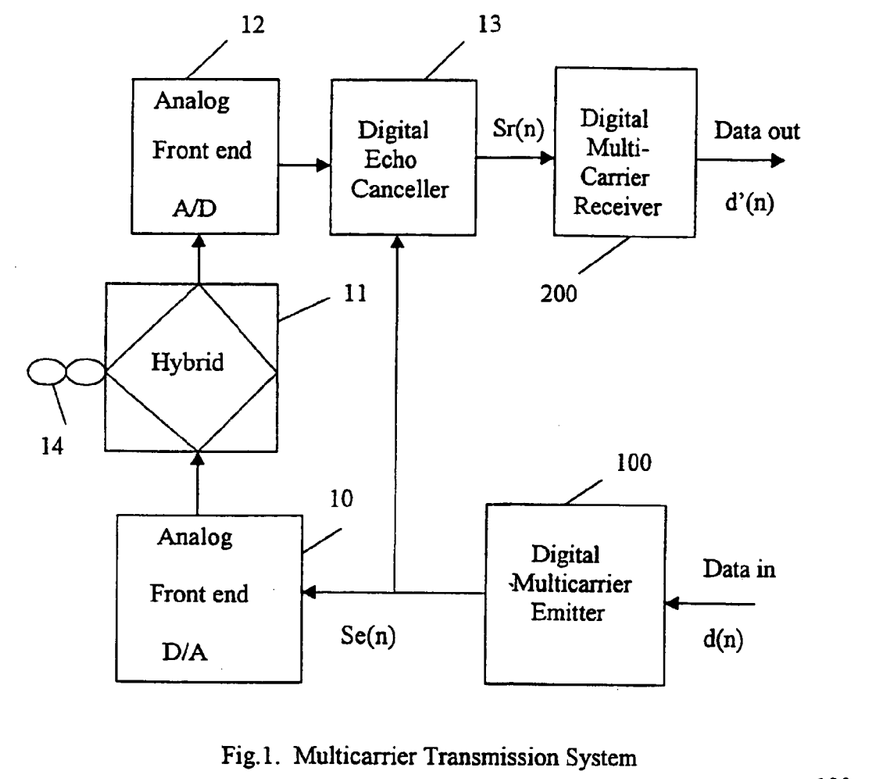
FIG. 1 is a simplified schematic block diagram of a multicarrier transmission system, in accordance with the present invention.

The block diagram of a multicarrier transmission system is shown in FIG. 1, for the case of a digital subscriber telephone line application. The input data stream d(n) is fed to a multicarrier emitter 100, which forms the signal Se(n) and is itself coupled to a module 10 that performs the digital-to-analog (D/A) conversion and the emitter analog front end functions. Basically, the emitter analog front end consists of an amplifier and a low-pass or pass-band filter to limit the spectrum sent to the hybrid circuit 11. The hybrid is connected to the twisted pair line 14 and its receiving port is connected to a module 12 that performs the receiver analog front end functions and the analog-to-digital (A/D) conversion. The receiver analog front end consists of a low-pass or band-pass filter to prevent aliasing and a variable gain amplifier. If symmetric, or full duplex transmission is contemplated, the A/D converter is coupled to an echo canceller 13 that ensures an adequate level of separation between the two directions of transmission. The echo canceller produces the signal Sr(n) and it is coupled to a multicarrier receiver 200 that delivers the output data stream d'(n). A detailed description of the analog front ends, hybrid circuits, A/D and D/A converters as well as echo cancellers is given in W. Y. Chen's book.

Figure 2:
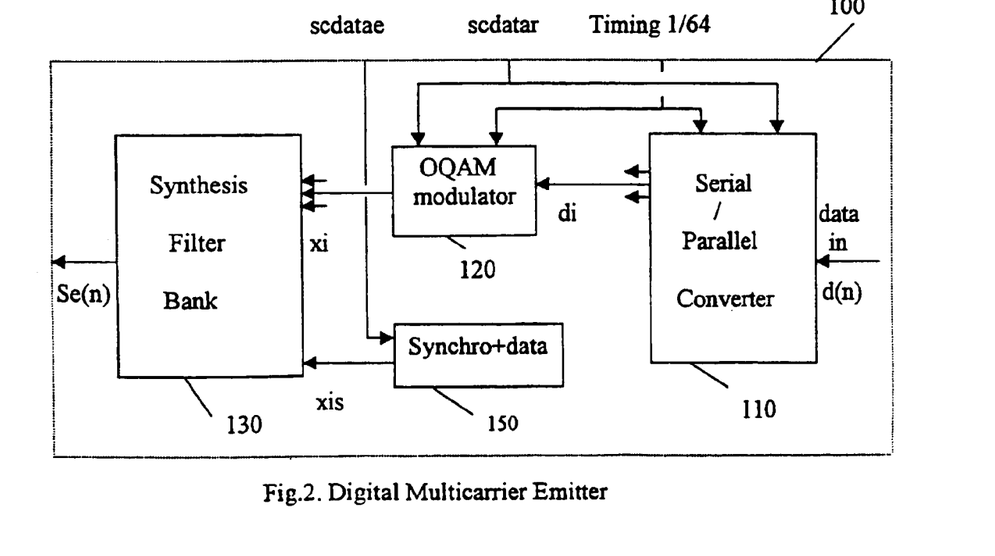
FIG. 2 is a schematic block diagram of the digital multicarrier emitter.
Figure 4:
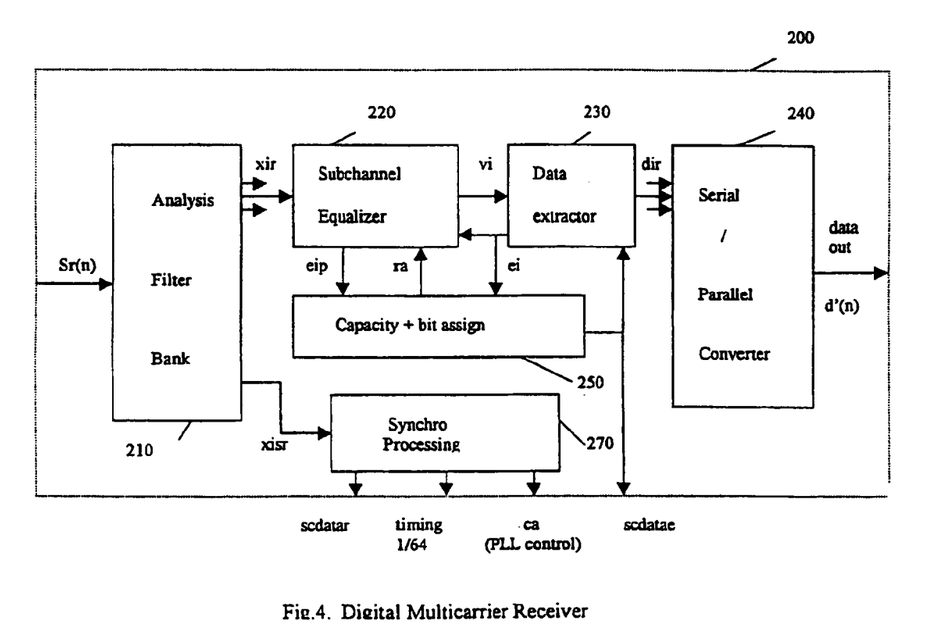
FIG. 4 is a schematic block diagram of the digital multicarrier receiver.

The present invention is concerned with the multicarrier emitter block 100 and receiver block 200 shown in greater details in FIGS. 2 and 4 respectively.

Turning to FIG. 2, the input data d(n) are processed by a cascade of three blocks, namely a serial/parallel converter 110, an OQAM modulator 120 and a synthesis filter bank (SFB) 130, to produce the emitted digital multicarrier signal Se(n). Conversely, as shown in FIG. 4, the received multicarrier digital signal Sr(n) is processed by a cascade of 4 blocks, namely an analysis filter bank (AFB) 210, a subchannel equalizer 220, a data extractor 230 and a parallel/serial converter 240, to produce the output data sequence d'(n). In the absence of transmission errors, d'(n) and d(n) are identical, except for a delay.

The filter banks, SFB 130 and AFB 210 consist of an FFT processor, coupled to a polyphase network as described in the paper by M. Bellanger and J. Daguet. Denoting by fs the sampling frequency of the multicarrier signal and by N the size of the FFT, which is twice the number of real subchannels, the subchannel frequency spacing is fs/N and the SFB and AFB operate at the rate 2(fs/N). For example, in subscriber line transmission, the following values may be selected: fs=2048 kHz; N=512; 2(fs/N)=8 kHz.

The specificity of the filter banks, SFB 130 and AFB 210 resides in the values of their coefficients, that are the same for both, or very close. The filter bank coefficients are computed from a prototype filter frequency response H(f) that is half-Nyquist in the pass-band and provides the maximum attenuation in the stop-band. Therefore, the cascade of the filter banks SFB and AFB exhibits a frequency response $H^2(f)$ that satisfies the first Nyquist criterion. It is advantageous to have $H^2(f)$ satisfy also the second Nyquist criterion, because intermediate signal samples take on well defined values. For example, if the data samples fed to the real or imaginary part of a subchannel are ±1, the intermediate signal samples at the output of the SFB-AFB cascade are {+1; 0; −1}.

A possible choice for the prototype filter frequency response is an approximation of the following function $$Ht(f)=\cos(\pi N f/2fs);\ 0\leq |f|\leq fs/N \quad (1)$$

$$Ht(f)=0;\ fs/N\leq |f|\leq fs/2$$

using the Fourier series expansion. Accordingly, a prototype filter with M=2P+1 coefficients has the following coefficient values, in the above example.

$$h_i = \frac{\cos(\pi i/256)}{1-(i/128)^2} \ ; -P \leq i \leq P \quad (2)$$

The input signal xi to the SFB block 130 that corresponds to subchannel i, is supplied by the OQAM modulator 120, a device that associates the input data di to quantized signal samples xi according to predetermined rules, as is well known in data transmission and described for example in the book by W. Y. Chen. The specificity here is that the signal samples take on real and imaginary values alternatively to obey the OQAM principle and the number of levels is determined by an external control signal denoted <<scdatar>> in FIG. 2. The control signal scdatar adjusts the number of bits transmitted by a subchannel to its estimated capacity, as will be explained below. For example, if 1 bit can be carried by subchannel i, the sample xi may take on the following values: ±1. But, if 2 bits can be carried, then the sample xi may take on the values: −1.5; −0.5; +0.5; +1.5.

The serial-to-parallel converter 110 splits the input bit stream d(n) into as many substreams as used subchannels and, for each substream, constitutes groups of bits di, under the control of the external signal scdatar, to feed the OQAM modulator 120. An additional external signal, denoted <<timing 1/64>> in FIG. 2, is used to insert a reference pattern in the signal sequence as will be explained below and it is fed to both blocks serial/parallel converter and OQAM modulator.

In the system, at least one subchannel is used to carry a synchronization signal described hereafter and service data. The corresponding signal xis is generated by the <<synchro+data>> unit 150, the service data, denoted <<scdatae>> in FIG. 2, being supplied by the receiver 200 shown in FIG. 4.

The timing of the system is organized in 3 levels which will be referred to as follows.

1) frame: it is the basic period in the system, associated with the subchannel spacing fs/N. For example, if fs/N=4 kHz, a frame is 0.25 ms. The frame is used for payload transmission, amplitude subchannel equalization and synchronization.
2) superframe: a duration of N1 frames. For example, if N1=64 the superframe length is 16 ms. It is used for supervised subchannel equalization, noise level measurement and synchronization.
3) hyperframe: a duration of N2 superframes. For example, if N2=64 the hyperframe length is 1024 ms. It is used to confirm or modify the bit assignments in the subchannels.

Turning to synchronization, at least one subchannel is used to transmit a specific signal. For example, it can be subchannel 69, whose central frequency is 4 kHz×69=276 kHz. The specific synchronization signal is designed to provide an efficient and robust control of the sampling times in the receiver and perform frame, superframe and hyperframe alignment. It contains the following superframe synchronization pattern.

$$SFP=\{1\ 1\ 1\ -1\ -1\ -1\ -1\ 1\ 1\ 1\ 1\ -1\ -1\ -1\ -1\ 1\}$$

Figure 3:
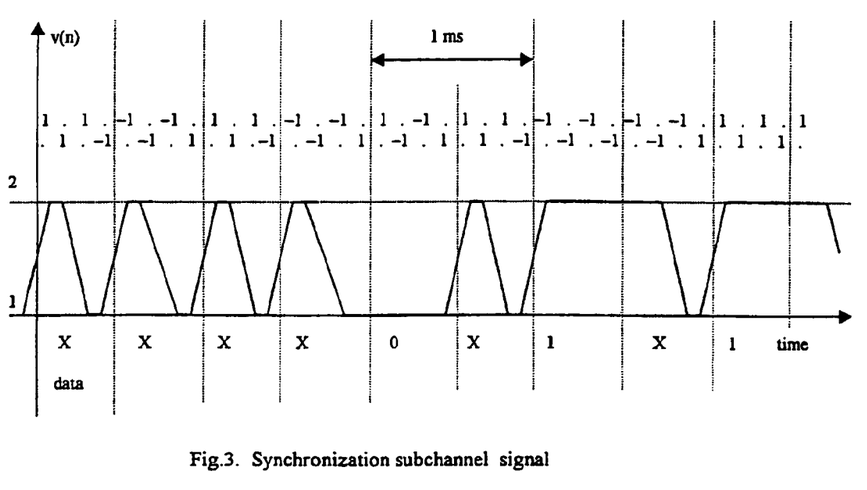
FIG. 3 is a drawing showing the waveform of the envelop of the signal in the synchronization subchannel.

With the real and imaginary alternation required by the OQAM technique, and the filtering operation performed by the filter banks, such a pattern produces, at the receiving end and in the absence of amplitude distortion in the transmission channel and no signal present in the neighboring subchannels, a complex signal whose squared magnitude v(n) is a fs/2N frequency sinewave of amplitude 0.5, added to a zero-frequency component of amplitude 1.5, as shown in FIG. 3. With the numerical values given as example, fs/2N=2 kHz, SFP has a duration of 2 ms and produces 4 periods of the 2 kHz sinewave, as is clearly apparent in the left part of FIG. 3. Since the superframe has a length of 16 ms, 14 ms are available for the transmission of service data. These data are encoded as $$P0=\pm\{1\ -1\ -1\ 1\}\text{ for a <<zero>>};\ P1=\pm\{1\ 1\ 1\ 1\}\text{ for a <<one>>}$$

Two consecutive data are separated by a period of the 2 kHz sinewave, as shown in FIG. 3.

The signal used to control the phase lock loop associated with the oscillator that delivers the received signal sampling frequency, or receiver clock generator, is obtained by filtering the 2 kHz component in v(n). This function is advantageously realized in two steps, as follows. A signal c(4n), with sampling frequency 2 kHz, is obtained by $$c(4n)=v(4n)-v(4n-1)-[v(4n-2)-v(4n-3)] \quad (3)$$

Then, an averaging operation is performed to attenuate the noise and the interferences from the neighboring subchannels $$ca(4n)=(1-e)ca[4(n-1)]+\epsilon c(4n) \quad (4)$$

where $\epsilon$ is a small constant, for example $\epsilon=10^{-3}$. The signal ca(4n) is used to control the phase lock loop of the clock generator.

The sign ± in P0 and P1 is used as shown in FIG. 3 to ensure that rising and falling edges of the 2 kHz signal keep a fixed relative position in time, regardless of the transmitted service data.

The hyperframe synchronization pattern HFP occurs every 64 superframes and it consists of a superframe in which the pattern SFP is repeated 4 times: HFP={SFP,SFP, SFP,SFP}.

In view of equalization in the receiver, an additional feature of the OQAM modulation block 120 in the emitter, is that it imposes fixed values to the first two samples of the superframe in each subchannel, for example: ±[1; 1]. A specific sign may be attributed to each subchannel, in order to avoid producing a large peak in the emitted multicarrier signal Se(n) at the beginning of each superframe.

In the receiver, the multicarrier received signal Sr(n) is processed by a cascade of 4 blocks, namely the analysis filter bank 210, a subchannel equalizer 220, a data extraction module 230 and a parallel-to-serial converter 240. The subchannel equalizer 220, which consists of a cascade of 3 distinct equalizers, is shown in more details in FIG. 5.

Figure 5:
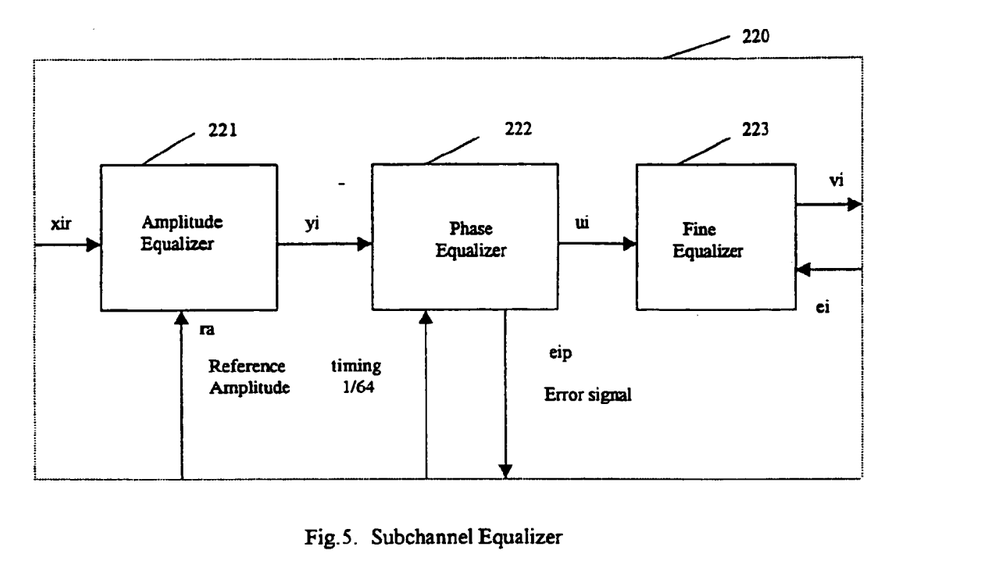
FIG. 5 is a schematic block diagram of the subchannel equalizer.

Turning to FIG. 5, in subchannel i, the amplitude equalizer 221 receives the input sequence xir(n) and a reference amplitude ra supplied by the bit assignment module 250. This reference amplitude ra represents the theoretical value of the root mean square of the power of the data signal in the subchannel. For 1-bit data, ra=1. The amplitude equalizer 221 computes a variable gain g1($n$), multiplies the input signal by that gain and transfers the result yi(n) to the phase equalizer 222. The variable gain is obtained through the two following operations $$sgm(n+1)=(1-\epsilon)sgm(n)+\epsilon|xir(n+1)| \quad (5)$$

where |x| stands for the modulus of x and $\epsilon$ is a small real number, for example $\epsilon=10^{-3}$.

$$g1(n+1)=ra/sgm(n+1) \quad (6)$$

Next, the phase equalizer 222 multiplies its complex input signal yi(n)=yir(n)+j yii(n) by a complex gain g2=a+j b to produce the output ui(n).

The gain is updated at the beginning of the superframe, using the first two samples, denoted yi(n) and yi (n+1). In fact, the following matrix system is solved in the least squares sense.

$$\begin{vmatrix} yir(n) & -yii(n) \\ yii(-n+1) & yir(n+1) \end{vmatrix} \begin{vmatrix} a \\ b \end{vmatrix} = \begin{vmatrix} 1 \\ 1 \end{vmatrix} \quad (7)$$

A preferred approximate implementation of the least squares algorithm is as follows $$a=A/C;\ b=B/C \quad (8)$$

where the quantities A, B and C are updated every superframe by $$A(p+1)=(1-\epsilon)A(p)+\epsilon[yir(n+1)+yii(n)] \quad (9)$$

$$B(p+1)=(1-\epsilon)B(p)+\epsilon[yir(n)-yii(n+1)]$$

$$C(p+1)=(1-\epsilon)C(p)+\epsilon[yir(n)yir(n+1)+yii(n)yii(n+1)]$$

The parameter $\epsilon$ is a small constant, for example $\epsilon=10^{-2}$, p is the superframe index. The initial values can be $A(0)=10^{-3}$, $B(0)=0$ and $C(p)$ is kept no smaller than $10^{-2}$.

Once the complex gain elements have been calculated, a real error signal is derived as follows.

$$eip(n)=1-[a\ yir(n)-b\ yii(n)] \quad (10)$$

$$eip(n+1)=1-[b\ yir(n+1)+a\ yii(n+1)]$$

The error signal is used for noise level estimation as described below.

The fine equalizer 223 computes the following output $$vi(n+l) = ui(n) + \sum_{k=-1}^{l} h_k(n)ui(n-k) \quad (11)$$

to be delivered to the data extraction module 230. The function of the fine equalizer is to complete the task of the two previous modules, in particular to remove the residual distortion. Its coefficients $h_k(n)$ generally take very small values and they can be updated at the superframe rate, using the same reference signal as the phase equalizer 222. In addition, they can be updated during regular transmission, according to the data directed equalizer principle, using the error signal $ei(n)$ provided by the data extractor 230 and the least mean squares (LIMS) algorithm $$h_k(n+1)=h_k(n)+\delta ei(n+1)ui(n-k) \quad (12)$$

where $\delta$, the adaptation step size, is a small value, for example $\delta=10^{-3}$.

Turning back to FIG. 4, the capacity of a subchannel is determined by the <<capacity+bit assign>> block 250. This block receives the error signal eip from the phase equalizer and the error signal ei from the data extraction block 230. It computes the following two variables.

$$E1(p)=(1-\epsilon 1)E1(p-1)+\epsilon 1[eip^2(n)+eip^2(n+1)]/2 \quad (13)$$

$$E2(n)=(1-\epsilon 2)E2(n-1)+\epsilon 2[ei^2(n)] \quad (14)$$

where the parameters $\epsilon 1$ and $\epsilon 2$ are small values like $10^{-2}$ and $10^{-3}$ respectively for example.

The quantity $E1(p)$ is computed every superframe and it is representative of the total distortion plus noise power present in the subchannel, before fine equalization. The quantity $E2(n)$ is computed at the rate 8 kHz and it is representative of the noise power in the subchannel. In normal operation, with the above equations (13) and (14), $E2(n)$ is smaller than $E1(p)$ and the difference depends on the improvement brought by the fine equalizer.

Based on the results of these calculations, a decision is made at the beginning of each hyperframe to keep or modify the number of bits assigned to each subchannel. Then, the corresponding information data, denoted <<scdatae>>, are fed to the <<synchro+data>> block 150 of the emitter 100, for transmission to the distant terminal during the current hyperframe and to the data extraction block 230 in the receiver 200, for use during the next hyperframe. The determination of the number of bits Nb assigned to the subchannel is a two-step process. First, Nb is calculated, for example through successive comparisons to thresholds, as $$Nb=Int[\tfrac{1}{2}Log_2(1/E1(p))-1];\ E1(p)<0.25 \quad (15)$$

where Int[x] stands for the integer part x. Then, $E2(n)$ is used to confirm the decision or improve it. For example, if $E2(n)$ is smaller than $E1(p)/4$, the number of bits may be increased by one.

The number of bits assigned to the subchannels is limited by the service data capacity. As pointed out earlier and shown in FIG. 3, the synchronization signal can transmit 14 bits of service data in a superframe with the numerical values given. If 3 bits are allotted to each subchannel, 4 subchannels can be handled per superframe and, if 240 subchannels are actually used, then, 60 superframes are sufficient to transmit the whole capacity information. The number of bits assigned to any subchannel is included in the range [0, 7].

The data extraction module 230 receives the signal vi(n) from the subchannel equalizer 220 and performs a quantization operation on the real and imaginary parts alternatively, using the quantization scale associated with the number of bits assigned to the subchannel. The binary representation of the quantized value dir is fed to the parallel/serial converter 240 and the quantization error ei(n) is sent back to the subchannel equalizer 220 to be used as per equation (12). The parallel/serial converter 240 produces the output data stream d'(n).

Figure 6:
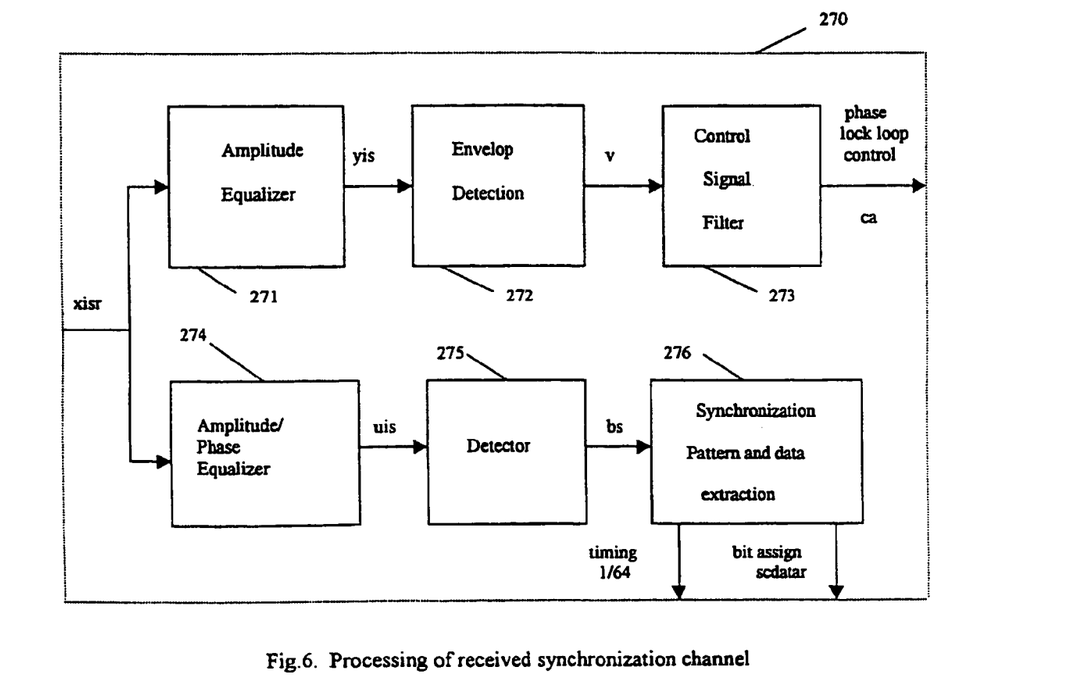
FIG. 6 is a schematic block diagram showing the functions involved in the processing of the signals received in the synchronization channel.

The <<synchro processing>> block 270 is shown in more details in FIG. 6. It receives the synchronization subchannel signal xisr and performs amplitude equalization through block 271, as described previously for the other subchannels. The signal obtained, yis(n) is fed to the <<envelop detection>> module 272 that computes the variable $v(n)=|yis(n)|^2$. Then, the control signal ca(4n) is generated by block 273 as explained above and according to equations (3) and (4).

The subchannel signal xisr is also fed to an amplitude/phase equalizer 274 that produces a signal uis(n), from which the binary data at the rate 8 kHz are recovered, with the help of a data detector 275. In fact, the data detector just takes the sign of the real and imaginary parts of uis(n) alternatively. The binary sequence bs (n) so obtained is fed to the <<synchronization pattern and data extraction>> block 276, that recognizes the superframe and hyperframe synchronization patterns and delivers the corresponding timing information denoted <<timing 1/64>> in the figures. The block also separates the bit assignment data, denoted <<scdatar>> and delivered to the OQAM modulator 120 of each subchannel and to the serial/parallel converter 110 in the emitter of the system.

INDUSTRIAL APPLICABILITY

An important feature of the system of the invention is that poor quality sections of the transmission channel frequency band can be exploited, through the combination of several subchannels. In each superframe, the synchronization subchannel signal carries the bit assignment data for a group of 4 subchannels. If, for these 4 subchannels, the noise power estimations E1j(p) with j=1, 2, 3 and 4, are all greater than 0.0625, which means Nb=0, and if the following condition is satisfied $$\sum_{j=1}^{4} (1/E1j(p)) > 16 \quad (16)$$

then, the same one-bit data signal is fed to these subchannels in the emitter and the corresponding phase equalizer outputs ui+j (n) in the receiver are summed as follows $$\text{sum}(n) = \sum_{j=1}^{4} ui + j(n)/EIj(p) \quad (17)$$

and the input data are retrieved as the sign of the variable sum(n). With that technique, a one-bit data sequence is transmitted by 4 subchannels. Clearly, this is an example and similar combinations can be elaborated for other numbers of subchannels, like 2, 3, 8 or 16. The output vi(n) of the subchannel equalizer 220 may also be used.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A multicarrier digital transmission system for communicating bits of digital data over set of different frequencies in a transmission channel's frequency band, each frequency constituting a subchannel of the transmission channel's frequency band, the multicarrier digital transmission system comprising:
   a. an emitter (100) for receiving a digital input data stream d(n) and for emitting therefrom a digital multicarrier signal Se(n), the emitter (100) including:
      i. a serial/parallel converter (110), which operates responsive to a synchronization and service data signal scdatar, for splitting the digital input data stream d(n) into a number of substreams of digital data di, each of the digital substreams di being assigned to at least one used subchannel of the transmission channel's frequency band;
      ii. an OQAM modulator (120) for receiving the digital substreams di produced by the serial/parallel converter (110), and for producing from the digital substreams di, responsive to the synchronization and service data signal scdatar, a set of N sequences of OQAM modulated quantized signal samples xi;
      iii. synchro+data unit (150) for generating, responsive to service data scdatae, a transmitted synchronization and service data signal xis that is assigned to at least one synchronization subchannel of the transmission channel's frequency band; and
      iv. a synthesis filter bank (130) having inputs for receiving:
         A. from the OQAM modulator (120) the set of N sequences of quantized signal samples xi, and
         B. from the synchro+data unit (150) the transmitted synchronization and service data signal xis; and
      for producing, from the received set of N sequences of quantized signal samples xi and from the received transmitted synchronization and service data signal xis, the multicarrier output digital signal Se(n); and
   b. a receiver (200) for receiving an input signal Sr(n) and for producing therefrom an output data stream d'(n), the receiver including:
      i. an analysis filter bank (210) for receiving the input signal Sr(n), and for producing:
         A. from used subchannels of the input signal Sr(n) a set of sequences xir equal to the number of used subchannels; and
         B. from the at least one synchronization subchannel of the input signal Sr(n) a received synchronization and service data signal xisr;
      ii. a subchannel equalizer (220) for receiving the sequences xir produced by the analysis filter bank (210) and, for producing from the received sequence xir an output signal vi, wherein the subchannel equalizer (220) in producing the output signal vi adjusts both the amplitude and phase of the received sequence xir by processing the received sequence xir through a cascade of:
         A. an amplitude equalizer (221);
         B. a phase and residual amplitude equalizer (222); and
         C. a fine equalizer (223);
      iii. a data extractor (230) which receives the signal vi from the subchannel equalizer (220) and, responsive to the service data scdatae, produces a binary representation dir of the received signal vi by quantizing real and imaginary parts thereof;
      iv. a parallel-to-serial converter (240) for receiving the binary representations dir from the data extractor (230) and for producing therefrom the output data stream d'(n);
      iv. a synchro processor (270) for receiving from the analysis filter bank (210) the received synchronization and service data signal xisr and for detecting therein at least the synchronization and service data signal scdatar to which the serial/parallel converter (110) and the OQAM modulator (120) respond; and
      vi. a capacity +bit assign (250) which receives from the phase and residual amplitude equalizer (222) of the subchannel equalizer (220) an error signal eip and from the data extractor (230) an error signal ei, and from the error signals eip and ei:
         A. for every used subchannel estimates a reference amplitude ra which the capacity+bit assign (250) transmits to the subchannel equalizers (220); and
      B. decides a number of bits to be assigned to every used subchannel which the capacity+bit assign (250) transmits via the service data scdatae both to data extractor (230) and to the synchro+data unit (150).

2. The multicarrier digital transmission system of claim 1 wherein a synchronization and service data signal transmitted via at least one synchronization subchannel contains a superframe synchronization pattern and a hyperframe synchronization pattern.

3. The multicarrier digital transmission system of claim 1, wherein the emitter (100) transmits the synchronization and service data signal xis envelope modulation.

4. The multicarrier digital transmission system of claim 1, wherein:
   a. the received synchronization and service data signal xisr has an envelope; and
   b. the receiver (200) uses the envelope of the received synchronization and service data signal xisr for producing signals:

i. for controlling the receiver sampling times; and
　　　ii. for performing frame synchronization including the synchronization and service data signal scdatar.

5. The multicarrier digital transmission system of claim 1, wherein each superframe the serial/parallel converter (110) and the OQAM modulator (120) of the emitter (100) introduce a short fixed pattern reference signal into each used subchannel.

6. The multicarrier digital transmission system of claim 1, wherein the receiver (200) updates the phase and residual amplitude equalizer (222) of the subchannel equalizer (220) at a superframe rate using a short fixed pattern reference signal present in each used subchannel.

7. The multicarrier digital transmission system of claim 1, wherein the fine equalizer (223) of the subchannel equalizer (220) is a decision directed equalizer.

8. The multicarrier digital transmission system of claim 1, wherein:
　　a. data specifying bit assignment in used subchannels are transmitted each hyperframe; and
　　b. the number of bits carried by each used subchannel are confirmed or modified each hyperframe.

9. The multicarrier digital transmission system of claim 1, wherein:
　　a. the same substream di is fed to at least two used subchannels; and
　　b. outputs from subchannel equalizers (220) corresponding to the at least two used subchannels are combined for producing the output signal vi.

10. The multicarrier digital transmission system of claim 9 wherein:
　　i. a weighted summation combines outputs from the subchannel equalizers (220);
　　ii. coefficients for the weighted summation are inverses of estimated total distortion powers for the used subchannels which receive the same substream di; and
　　iii. data are obtained from the summed outputs using the sign of the weighted summation.

11. The multicarrier digital transmission system of claim wherein coefficients in the filter banks (130) and (210) are selected so a prototype filter response satisfies both:
　　a. the first Nyquist criterion; and
　　b. the second Nyquist criterion.

* * * * *